United States Patent
Meisiek

(10) Patent No.: US 6,339,366 B1
(45) Date of Patent: Jan. 15, 2002

(54) MAGNET VALVE

(75) Inventor: Achim Meisiek, Rudersberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/762,972

(22) PCT Filed: Apr. 29, 2000

(86) PCT No.: PCT/DE00/01362

§ 371 Date: Mar. 30, 2001

§ 102(e) Date: Mar. 30, 2001

(87) PCT Pub. No.: WO00/79118

PCT Pub. Date: Dec. 28, 2000

(30) Foreign Application Priority Data

Jun. 19, 1999 (DE) .......................................... 199 28 207

(51) Int. Cl.$^7$ ................................ H01F 5/00; H01F 7/08
(52) U.S. Cl. ....................... 335/282; 335/273; 335/281; 251/129.16; 251/129.18; 251/129.15; 251/129.21
(58) Field of Search .................................. 335/236, 237, 335/228, 281, 297, 298, 258, 282; 251/129.02, 129.15, 129.16, 129.18–129.22

(56) References Cited

U.S. PATENT DOCUMENTS

| | | | | |
|---|---|---|---|---|
| 4,037,704 A | * | 7/1977 | Golobay et al. | ............. 335/274 |
| 5,424,704 A | * | 6/1995 | Dolle | ......................... 335/298 |
| 5,560,585 A | * | 10/1996 | Krimmer et al. | ....... 251/129.21 |

* cited by examiner

Primary Examiner—Ramon M. Barrera
(74) Attorney, Agent, or Firm—Ronald E. Greigg

(57) ABSTRACT

A magnet valve, especially for tank venting in motor vehicles, having at least one valve opening and having a valve member, which for opening and closing cooperates with the at least one valve opening and which, forming a magnet armature of an electromagnet, is disposed opposite a magnet core of the electromagnet, an exciter coil being disposed on a coil carrier that is disposed in a magnet housing and surrounds the magnet core, and a thread being provided in the magnet housing, which thread is screwed to a first male-threaded portion of the magnet core, wherein a second male-threaded portion is disposed on the magnet core, which male-threaded portion, as the magnet core is screwed into the magnet housing, forms a thread course in the coil carrier.

2 Claims, 1 Drawing Sheet

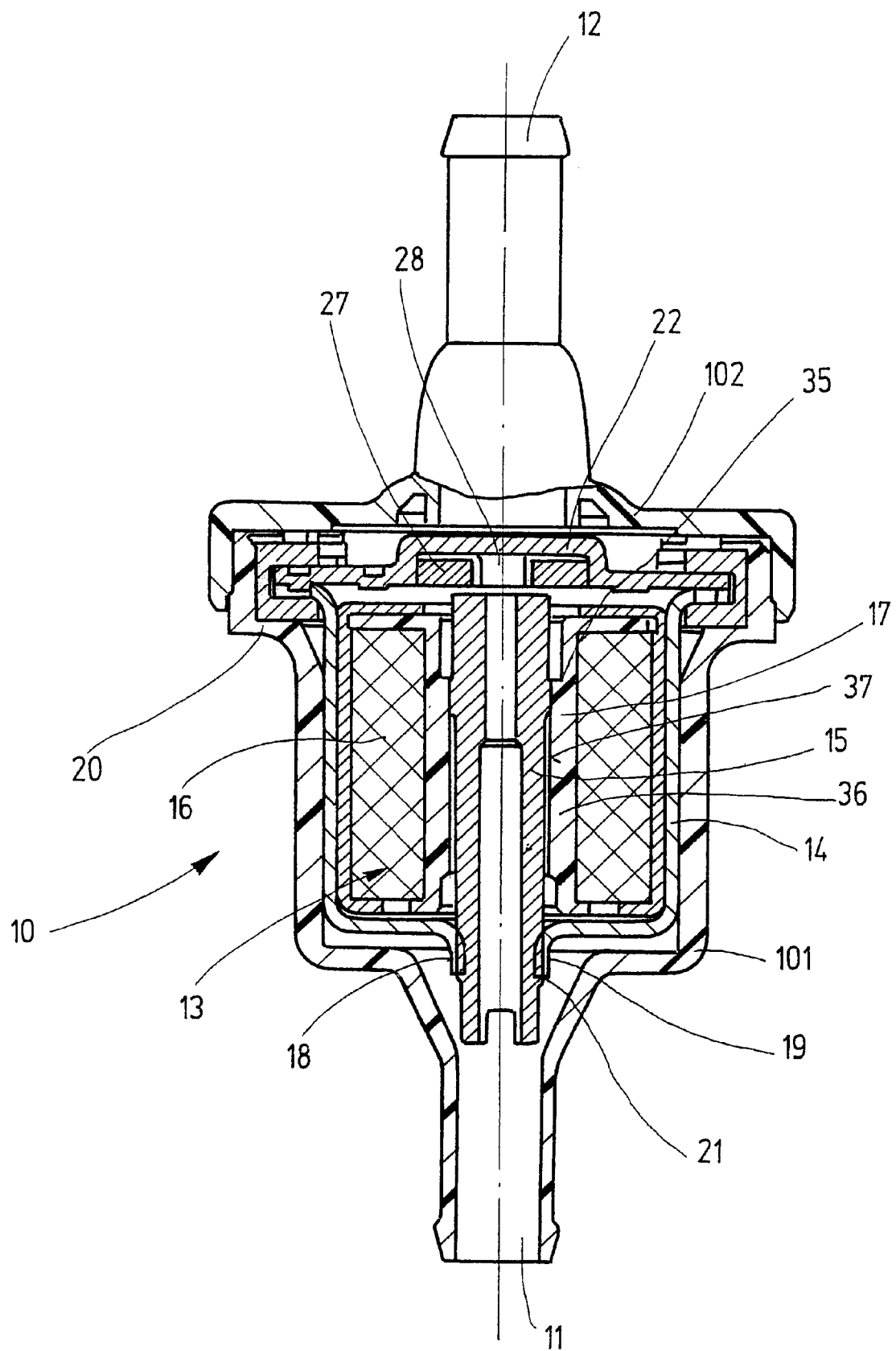

MAGNET VALVE

CROSS-REFERENCE TO RELATED APPLICATION

This application is a 35 USC 371 application of PCT/DE 00/01362 filed on Apr. 29, 2000.

BACKGROUND OF THE INVENTION

1. Field of the Invention

The invention relates to an improved magnet valve, and more particularly to such valves especially for tank venting in motor vehicles.

2. Description of the Prior Art

Magnetic valves for venting vehicles tanks are known and disclosed for instance by German Patent Disclosures DE 42 44 113 A1, DE 196 11 886 A1, and DE 198 52 980.5. In such valves, the magnet core is axially displaced in the magnet housing for adjustment purposes by being screwed into the thread. Such an adjustment is disclosed for instance by U.S. Pat. No. 5,424,704 as well, but in that case the magnet core is screwed into the plastic coil carrier.

In order after the adjustment to provide an anti-rotation element, it is known to apply plastic layers, such as Tuflok or an adhesive, to the thread. Furthermore, anti-rotation elements by later welding or by calking of the two threads to one another are also known.

Such anti-rotation elements require additional method steps for producing the magnet core and therefore entail additional cost. Furthermore, severely fluctuating loosening torques caused by tolerance fluctuations of the magnet core and of the cup-shaped magnet housing as well as of the plastic, in particular Tuflok or adhesive, layer are problematic.

Finally, an anti-rotation element of this kind is also vulnerable to temperature fluctuations and vibrational stresses.

SUMMARY OF THE INVENTION

An object the present invention is to provide a magnet valve of this generic type which, in a simple way, enables adjustment with maximum invulnerability to temperature fluctuations and vibrational stresses as well as tolerance fluctuations between the magnet core and the magnet housing, and to prevent relative rotation of the magnet core.

The further male-threaded portion on the hollow-cylindrical magnet core advantageously forms its own thread course in the coil carrier without metal-cutting machining and presses itself in, in a manner fixed against relative rotation, thus in a simple way attaining an optimal anti-rotation element, and because the adhesive or plastic layers known from the prior art are dispensed with, the tolerances of only two components now have to be taken into account for the anti-rotation element, and these can be made more secure in process terms with a view to production. Furthermore, an anti-rotation element of this kind has loosening torques that can be readily adjusted. Furthermore, this arrangement has substantially higher strength than a thin layer of plastic or adhesive that is employed in anti-rotation elements known from the prior art. The precision of adjustment is preserved because the magnet core is screwed into the metal magnet housing.

BRIEF DESCRIPTION OF THE DRAWING

Further advantages and characteristics of the invention will be apparent from the detailed description contained herein below taken with the single drawing for sure which is, a longitudinal section through a valve according to the invention, shown schematically.

DESCRIPTION OF THE PREFERRED EMBODIMENTS

One exemplary embodiment of a valve, shown in longitudinal section in the drawing, is used for metered admixture of volatilized fuel from the fuel tank of a mixture-compressing internal combustion engine with externally supplied ignition (not shown), into the engine, for instance into an intake tube, or in the case of direct gasoline injection directly into an engine cylinder, and is part of a fuel vapor trapping system, not shown in further detail, of an internal combustion engine. The construction and function of such fuel vapor trapping systems can be learned for instance from *Bosch Technische Unterrichtung Motormanagement Motronic* [Bosch Technical Instruction, Motronic Motor Management], 2nd Edition, August 1993, pages 48 and 49. A tank venting valve and its function can be learned for instance from the above mentioned German references, DE 42 44 113 A1 and DE 196 11 886 A1.

The tank venting valve has a two-part valve housing 10, with a cup-shaped housing part 101 and a cap-like housing part 102 closing off the housing part 101. The housing part 101 has an inflow stub 11 for connection to a venting stub of the fuel tank, or to an activated-charcoal-filled reservoir downstream of it for the volatilized fuel. The housing part 102 has an outflow stub 12 for connection to the intake tube of the engine. The inflow stub 11 and the outflow stub 12 are each disposed axially, for instance aligned with one another, in the housing parts 101, 102. An electromagnet 13 is disposed in the interior of the cup-shaped housing part 101.

The electromagnet 13 has a cup-shaped magnet housing 14, with a coaxial hollow-cylindrical magnet core 15 that penetrates the cup bottom and with a cylindrical exciter coil 16, which is seated on a coil carrier 17 of plastic that surrounds the magnet core 15 in the magnet housing 14. Embodied on the bottom of the metal magnet housing 14 is an outward-protruding threaded stub 18 with a female thread 19, which is screwed to a first male-threaded portion 21 of the hollow-cylindrical magnet core 15. Thus by rotation in the magnet housing 14, the magnet core 15 can be axially displaced highly exactly for adjustment purposes, because of the metal-to-metal screw fastening. The magnet core 15 is aligned with the inflow stub 11, so that volatilized fuel flowing in here flows directly through the magnet core 15.

To achieve an anti-rotation function, a second male-threaded portion 35 is disposed on the magnet core 15, in the region of the coil carrier 17; when the magnet core 15 is screwed into the female thread 19 disposed on the threaded stub 18, this second male-threaded portion forms its own thread course in the coil carrier 17 without metal-cutting machining. The coil carrier 17 here has a carrier sleeve 36, which has a through opening 37, which for instance is graduated, and whose diameter is for instance greater than the diameter of the first male-threaded portion 21 of the magnet core 15, so that here the magnet core 15 is inserted from above, with the end that has the first male-threaded portion 21 leading, through the through opening 37 in order to come into contact with the female thread 19 of the threaded stub 18. As the first male-threaded portion 21 is screwed into the threaded stub 18, the second male-threaded portion 35 then cuts into the through opening 37 of the carrier sleeve 36 and forms an anti-rotation element. An anti-rotation element of this kind has high strength, is simple to produce, and makes readily adjustable loosening torques possible. In particular, additional materials for the anti-rotation element that are known from the prior art, such as adhesive or plastic layers, can be dispensed with.

The edge of the magnet housing 14 is angled to form an annular bearing flange 20. Received on the bearing flange 20 is a valve seat body, which forms a short-circuit yoke 22 of the electromagnet 13 and which covers the magnet housing 14 and rests peripherally on the bearing flange 20. In the short-circuit yoke 22 that forms the valve seat body, valve openings are provided, which can be closed by means of a valve member 27 that acts as a magnet armature and is disposed between the short-circuit yoke 22 and the magnet core 15. Centrally in the valve member 27, coaxially with the hollow-cylindrical magnet core 15, an axial through opening 28 is provided through which volatilized fuel arriving from the inflow stub 11 can reach the outflow stub 12 when the valve openings are open. The valve member 27, made from magnetically conductive material, is disposed, spring-loaded in the valve closing direction, in the direction of the outflow stub 12.

The stroke of the valve member 27 is adjusted by means of the axial displacement of the magnet core 15. Because of the metal-to-metal screw fastening of the magnet core 15 on the threaded stub 18, only negligibly slight changes in the valve member stroke result even in the event of temperature changes. By comparison, the plastic-to-metal screw fastening between the magnet core 15 and the carrier sleeve 36 upon a temperature change brings about an increase in the relative rotation prevention, because of the different coefficients of thermal expansion.

The foregoing relates to preferred exemplary embodiments of the invention, it being understood that other variants and embodiments thereof are possible within the spirit and scope of the invention, the latter being defined by the appended claims.

I claim:

1. In a magnet valve, especially for tank venting in motor vehicles, having at least one valve opening and having a valve member (27), which for opening and closing cooperates with the at least one valve opening and which, forming a magnet armature of an electromagnet (13), is disposed opposite a magnet core (15) of the electromagnet (13), an exciter coil (16) being disposed on a coil carrier (17) that is disposed in a magnet housing (14) and surrounds the magnet core (15), and a thread (19) being provided in the magnet housing (14), which thread is screwed to a first male-threaded portion (21) of the magnet core (15), the improvement comprising a through opening (37) having no threads disposed in the coil carrier (17), and a second male-threaded portion (35) disposed on the magnet core (15), which second male-threaded portion (35), as the magnet core (15) is screwed into the magnet housing (14), engages and forms a thread course in the coil carrier (17) for rotation prevention.

2. The valve of claim 1 wherein that the second male-threaded portion (35) forms the thread course in the coil carrier (17) without metal-cutting machining.

* * * * *